United States Patent Office 3,198,477
Patented Aug. 3, 1965

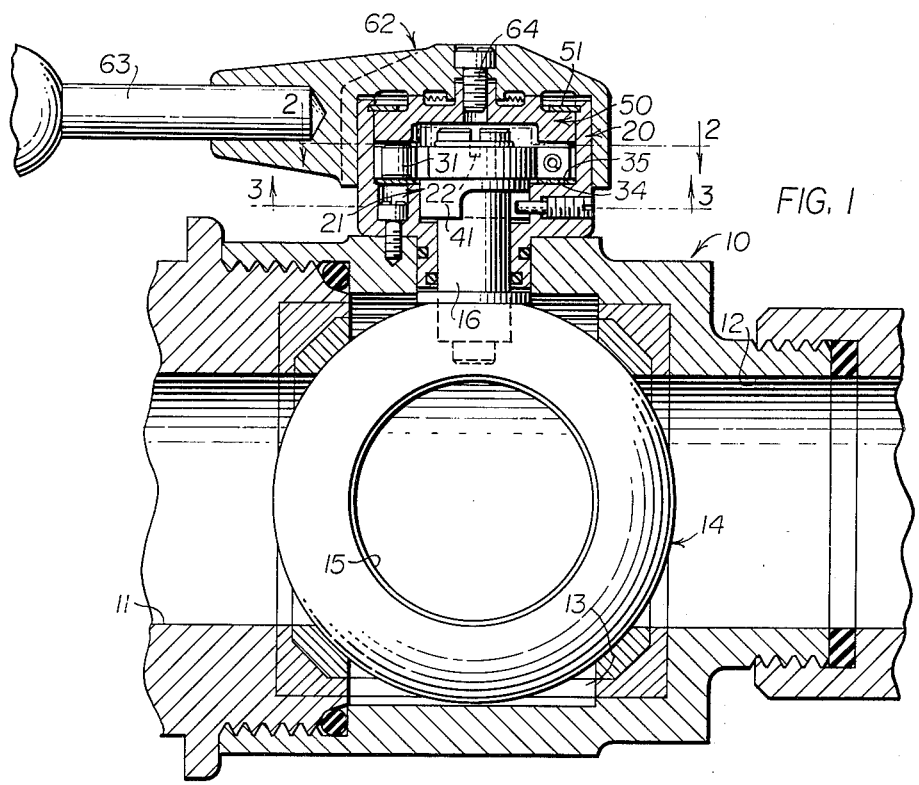
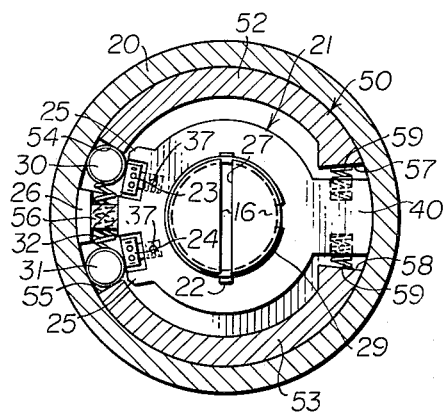

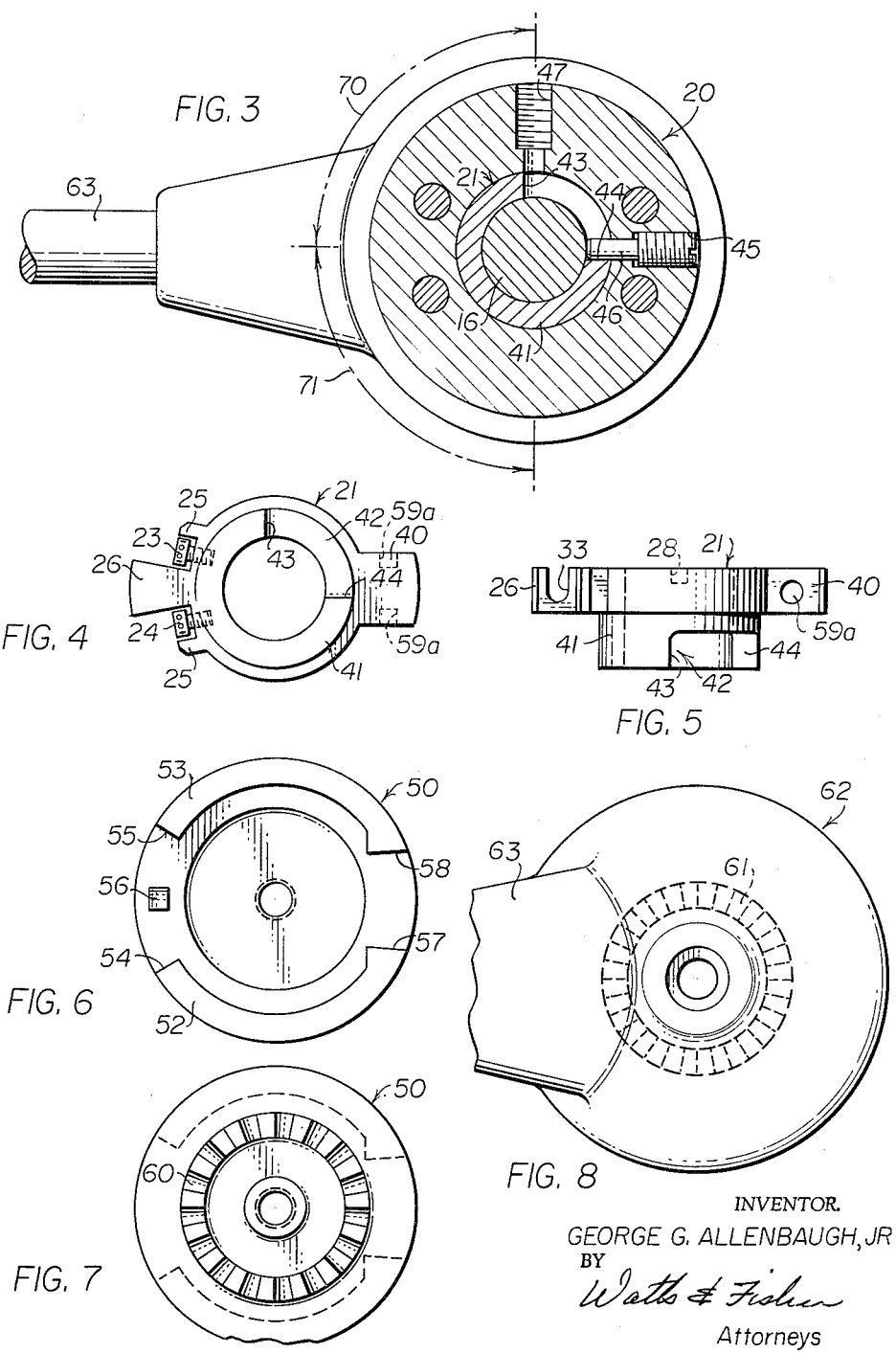

3,198,477
SELF-LOCKING VALVE
George G. Allenbaugh, Jr., Rittman, Ohio, assignor, by mesne assignments, to Akron Brass Company, Wooster, Ohio, a corporation of Ohio
Filed Dec. 27, 1961, Ser. No. 162,361
20 Claims. (Cl. 251—77)

This invention relates generally to fluid valves, and more specifically to improved ball-type valve constructions.

In fire fighting and other applications, ball-type valves are customarily used to control the flow of large volumes of liquid under relatively high pressures. The usual valve construction includes a valve body having an inlet port and an outlet port. A rotatable circular valve plug, such as a substantially spherical ball, is seated within the valve body to control the flow of liquid through the valve. This valve plug has a through passage which is aligned with the inlet and outlet ports in a full open position which is one extreme position of rotation to permit full liquid flow. The ball passage is at right angles to the inlet and outlet ports in a full closed position at the opposite extreme. To obtain a selected liquid flow less than the full open flow, the valve plug is rotated to any partially open position between the extreme positions.

When the rotatable valve plug is in a partially open position, the action of flowing liquid against the walls of the plug passage will rotate the plug toward its fully closed position unless some means is provided to retain the plug in the selected partially open position. While this self-closing problem has been recognized by the prior art, none of the conventional ball-type valve constructions have provided a self-locking construction which effectively overcomes the problem.

Another marked limitation of prior art locking arrangements is that many are difficult to release to permit valve operation. This is an obvious and serious disadvantage when the valves are used in fire fighting equipment and similar installations.

In some applications, obstructions limit the range of rotation of the valve handle. Other applications require that the directions in which the handle is normally rotated to open and close the valve be reversed. It will therefore be seen advantageous to provide a valve in which the handle position can be easily adjusted relative to the valve body and in which the normal direction required to open or close the valve can be reversed. With this invention, both this adjustment and this reversal of rotation can be accomplished simply and without a major disassembly of the valve.

An object of the present invention is to provide a novel and improved ball-type valve construction in which the valve plug is automatically and effectively locked in any position of rotative adjustment.

An additional object of the invention is to provide a locking means which increases its holding power to an increase in pressure on the valve plug.

Another object of the invention is to provide a ball valve construction as described above in which the valve plug is unlocked to permit operation of the valve without a special unlocking manipulation.

Still another object of the invention is to provide a novel locking structure for a rotatable valve plug which can be incorporated into conventional ball valve constructions.

A general object of the invention is to provide a construction in which the rotatable plug automatically locks itself in any adjusted position.

A further object of the invention is to provide an improved ball-type valve handle construction wherein the rotational position of the valve handle relative to the valve plug can be adjusted and the normal direction of movement required to open or close the valve can be reversed.

The foregoing objects have been attained and the disadvantages of the prior art overcome by a ball-type valve construction embodying a locking ring that is fixed to a rotatable shaft which is connected to the valve plug. This locking ring is carried in a housing. When the valve is in an open position the ring is locked against rotation by one of a pair of rollers that are wedgingly engaged between peripheral surface portions of the locking ring and the inside wall of the housing. This locking action is such that the greater the pressure exerted on the plug to cause it to rotate the greater is the resistance of the valve to such rotation.

A drive ring is rotatably mounted in the housing adjacent the locking ring. This drive ring is provided with roller-engaging legs so that, when the drive ring is rotated, the roller locking the ring against rotative movement is disengaged. The drive ring further includes structure for engaging and rotating the locking ring after the roller has been unlocked.

According to the preferred embodiment of the invention, a handle plate, having an attached valve handle, is provided for rotating the drive ring. This construction is such that the locking ring can be unlocked and the shaft and valve plug rotated by simply rotating the handle. Consequently, the valve can be easily and quickly operated and will automatically lock itself when the handle is released.

Another feature of the invention is that the handle plate can be rotated relative to the drive ring so that the angular position of the handle may be varied to suit the particular installaion of the valve.

The invention further contemplates cooperating structure on the housing and the locking ring for limiting the rotation of the valve plug between the fully opened and fully closed positions of the valve. This structure is such that the direction of movement of the handle required to open or close the valve can be reversed. The invention thus provides for an advantageous operation in which the handle can be set to operate through a predetermined arcuate path and in which the direction of movement along this path for opening or closing the valve can be changed to suit the particular installation.

Other objects and advantages of the invention will be apparent from the following detailed description and the accompanying drawings.

In the drawings:

FIGURE 1 is a cross-sectional view of a ball-type valve embodying the invention;

FIGURE 2 is a cross-sectional view taken on the line 2—2 of FIG. 1;

FIGURE 3 is a cross-sectional view taken on the line 3—3 of FIG. 1;

FIGURE 4 is a bottom plan view of the locking ring;

FIGURE 5 is a side elevational view of the locking ring;

FIGURE 6 is a bottom plan view of the drive ring;

FIGURE 7 is a top plan view of the drive ring; and,

FIGURE 8 is a top plan view of the handle plate.

Referring now to the drawings, and to FIGURE 1 in particular, a floating ball-type fluid valve is shown which embodies the invention. This valve, which is particularly suitable for use in a high pressure water line, is shown to include a conventional valve body 10 having an inlet port 11 and an opposite, coaxial outlet port 12. The valve body 10 has a central cavity 13 that is shaped to receive a valve plug, such as a valve ball 14, for regulating fluid flow through the valve body. In the illustrated construction, the valve ball 14 has a through passage 15 and is rotatable between a first position in which the passage is aligned with the inlet and outlet ports to permit full fluid flow through the valve body and a second position in which the passage 15 is at right angles to the inlet and outlet ports to block fluid flow. A shaft 16 is connected to the valve ball 14 for permitting it to be rotated to any position of adjustment between the first or open position of the valve and the second or closed position of the valve.

It will be understood that the foregoing valve construction is not limiting of the invention and that it has been chosen only for the purpose of clearly describing the invention and illustrating to those skilled in the art how it can be readily incorporated into this and other conventional valve constructions.

According to the present invention, the shaft 16 extends into a generally cup-shaped housing 20 which is mounted on the valve body 10. An annular locking ring 21 is seated in the housing 20 and is keyed to the shaft 16 by a horizontal key 22. As shown most clearly in FIG. 2, the key 22 is mounted in a slot 27 formed in the upper end of the shaft and in a corresponding slot 28 in the locking ring (FIG. 5). An O-ring 29 is fitted in a groove around the shaft 16 to prevent displacement of the key 22.

The locking ring 21 is provided with peripheral, bearing surface portions 23 and 24 which are spaced from the inside wall of the housing 20. The outer surface portions 23 and 24 are eccentric with relation to the axis of the cup-shaped housing 20 and converge toward the inside wall of the housing in opposite directions of rotation of the shaft 16. These bearing surface portions 23 and 24 are preferably formed by the heads of spanner bolts which are threaded into the locking ring between projections 25 and a finger 26 which radially extends from the locking ring between the spanner bolts (FIG. 5).

Rollers 30 and 31 are disposed contiguous to the surfaces 23 and 24, respectively. These rollers 30 and 31 are normally urged into wedging engagement between the inside wall surface of the housing and the surfaces 23 and 24 by a tension spring 32. In the illustrated construction of the invention, the tension spring 32 is carried in a channel 33 formed in the finger 26, (FIG. 5). The rollers 30 and 31 are shown to rest on a wear ring 34 which is seated on an inner, annular shoulder 35 of the housing 20.

When assembling the valve, the spanner bolts are threaded outwardly until the bolt heads 23 and 24 respectively, engage the rollers 30 and 31. The bolts are then threaded inwardly approximately one-half turn. The bolts may be locked in their adjusted position by peening their threads with a suitable tool inserted in holes 37 drilled in the locking ring.

As will be apparent from the foregoing description, the roller 30 normally acts to prevent counterclockwise rotation of the ring 21, as viewed in FIG. 2, because of the wedging engagement of the roller between the surface 23 and the inside wall of the housing 20. Similarly, the roller 31 normally prevents clockwise rotation of the ring 21, as viewed in FIG. 2, because of the wedging engagement of the roller between the surface 24 and the inside wall of the housing 20.

The locking ring 21 is shown to further include a finger 40 that extends from the ring in a direction opposite the finger 26, and a depending, annular collar 41 that embraces the shaft 16. As is most clearly illustrated in FIG. 5, this collar 41 is cut away in one quadrant to form a recess 42 having spaced end walls 43 and 44. The recess end walls 43 and 44 comprise abutments which respectively define the closed position of the valve ball 14 (FIG. 1) and the open position of the valve ball. In the preferred construction of the invention, the housing 20 has a stop pin receiving hole 45 through its side wall. A stop pin 46 is threaded into the hole 45 to project within the recess 42 between the abutments or recess end walls 43 and 44. This pin 46 is engageable with either of the end walls 43 or 44 to limit rotation of the shaft 16 between the fully open and fully closed positions of the valve ball 14.

For reasons to be hereinafter discussed in detail, the preferred construction of the invention includes a second pin-receiving hole 47 formed through the side wall of the housing 20. As most clearly shown in FIG. 3, this second hole 47 is angularly spaced 90° from the hole 45 and is adapted to selectively receive the stop 46. Assuming that the position of the locking ring 21 in FIG. 3 corresponds to the closed position of the valve ball 14, the direction of rotation of the shaft 16 required to open the valve ball may be reversed from clockwise movement to counterclockwise movement by mounting the stop pin 46 in the hole 47.

A rotatable drive ring 50 straddles the end of the shaft 16 and is held within the housing 20 by a ring 51. Referring particularly to FIGS. 2 and 6, the drive ring 50 is shown to have arcuate ribs 52 and 53 formed on its undersurface, the ribs 52 and 53 being symmetrically spaced on either side of a diameter of the drive ring. Corresponding ends 54 and 55 of the ribs 52 and 53, respectively, constitute roller-engaging legs that are respectively disposed in close adjacency to the rollers 30 and 31. A projection 56 is also formed on the undersurface of the drive ring intermediate the ends 54 and 55 of the arcuate ribs. This projection 56 holds the spring 32 in the recess 33 of the locking ring finger 26 when the drive ring is assembled in the housing.

The ends 57 and 58 of the ribs 52 and 53 respectively, which are opposite the ends 54 and 55, constitute drive legs. These drive legs 57 and 58 straddle the finger 40 of the locking ring 21 and are closely adjacent to its sides. When the drive ring 50 is rotated clockwise, as viewed in FIG. 2, the roller-engaging leg 55 first contacts the roller 31 and forces it out of wedging engagement between the surface 24 and the inside wall of the housing 20. Thereafter, the drive leg 57 contacts the finger 40 to force the locking ring 21 and the connected shaft 16 to rotate clockwise. When the locking ring is rotated in this manner, the roller 30 merely rolls out of wedging engagement between the surface 23 and the inside wall of the housing. Similarly, when the drive ring is rotated counterclockwise, as viewed in FIG. 2, the roller-engaging leg 54 first engages the roller 30 to force it out of wedging engagement between the surface 23 and the inside wall of the housing. Thereafter, the drive leg 58 contacts the finger 40 to cause rotation of the locking ring. The roller 31 does not hold the locking ring against counterclockwise rotation, but merely rolls out of wedging engagement.

It has been found desirable to provide centering springs 59 at each side of the locking ring finger 40. These springs may be inserted in recesses 59a formed in the finger 40. As shown in FIG. 2, the springs 59 normally center the finger 40 between the drive legs 57 and 58. This prevents uncontrolled rotation of the drive ring 50, as in applications in which the valve is subjected to vibration, and consequent unlocking of the ring 21.

In order to provide for convenient rotation of the drive ring 50 in either direction, an annular ring of teeth 60 is formed on its upper surface (FIG. 7). This annular ring of teeth 60 cooperates with the teeth 61 of a handle plate 62, (FIG. 8) which is freely rotatable on the housing 20. The handle plate 62 is provided with an extending handle 63 so that the handle plate can be conveniently turned to effect rotation of the drive ring 50 when the teeth 60 and 61 are in engagement.

As previously discussed, it is often desirable to change the annular position of the handle 63 so that it can be conveniently manipulated when the valve is installed. To this end, the handle plate 62 is connected to the drive ring 50 by a pin or bolt 64. When it is desired to change the position of the handle, the pin 64 is loosened so that the handle plate can be slid upwardly on the housing to disengage the teeth 60 and 61. The handle plate can be then rotated relative to the drive ring to the desired position and the teeth 60 and 61 re-engaged by tightening the pin. Thus, the handle plate can be angularly adjusted relative to the valve body in as many positions as there are teeth 60 on the drive ring 50.

The operation of the valve embodying the present invention will be largely apparent from the foregoing description. In summary, when it is desired to rotate the valve ball 14 from its closed position illustrated in FIG. 1 to its open position, or any intermediate position for regulating the flow of fluid, the handle plate 62 is rotated by the handle 63 to produce corresponding rotation of the drive ring 50. In turn, the drive ring 50 first contacts one of the rollers 30, 31 which is wedgingly locking the locking ring 21 against movement in the direction of rotation of the handle. This contact of the locked roller releases the roller. Thereafter the drive ring engages the finger 40 to rotate the locking ring. This rotation of the locking ring 21 causes the shaft 16 to rotate and move the valve ball 14 to the desired position. When the handle 63 is released the spring 32 urges the rollers 30 and 31 back into wedging engagement between the surfaces 23 and 24 of the locking ring and the inside wall of the housing 20 to prevent untoward movement of the valve ball from its adjusted position.

The locking action for preventing movement of the valve ball 14 is just the opposite form that described above. Referring again to FIG. 2, it will be seen that the roller 31 will wedgingly engage the surface 24 of the locking ring and the inside wall of the housing 20 in the event that water pressure tends to drive the shaft 16 clockwise. This wedging action of the roller 31 locks the shaft 16 and thus prevents any significant movement of the valve ball 14 from its adjusted position. Conversely, any tendency of the shaft 16 to move counterclockwise will be effectively resisted by the wedging and locking action of the roller 30.

As noted above, an important feature of the invention is that the valve can be unlocked and operated by simply turning the valve handle 63. This feature is of particular significance when the valve is used in fire fighting equipment and must be operated as quickly and easily as possible. A concomitant advantage is that the valve will automatically lock itself after it has been set without any special movement of the handle or attention by the operator.

The arc through which the valve handle 63 operates can be readily adapted to the particular installation or application of the valve by rotatively adjusting the handle plate 62 in the manner previously discussed. In addition, the direction of movement of the handle to open or close the valve can be changed by the position of the stop pin 40. For example, referring to FIG. 3 wherein the handle 63 is illustrated in phantom outline, it will be seen that movement of the handle in the direction of arrow 70 will open the valve by rotating the ball 14 from its position in FIG. 1 to a position where the passage 15 is aligned with the inlet and outlet ports 11 and 12, respectively. In the fully open position of the valve, the recess end wall 43 will abut the stop pin 46.

Assuming that the position of the locking ring 21 in FIG. 3 represents the closed position of the valve, the direction of movement of the handle to open the valve may be reversed by mounting the stop pin 46 in the hole 47. Thus assembled, the closed position of the valve plug will be defined by engagement of the recess end wall 43 and the stop pin. The valve plug may be then rotated to its fully open position by rotating the handle in the direction of arrow 71 until the recess and wall 44 engages the stop pin.

Another advantage of the above construction is that the operative direction of movement of the handle can be reversed without changing the arc through which it is moved. For example, the handle 63 is moved clockwise through the quadrant represented by the arrow 70 in FIG. 3 to open the valve. By placing the stop pin 46 in the hole 47 and radially adjusting the handle so that it extends in the same direction as the hole 47, the handle may be moved counterclockwise through the same arc 70 to open the valve. This is of advantage since in numerous installations it is more convenient to grasp the handle for opening movement at one end of its arcuate path than the other.

It will thus be seen that the invention provides a versatile ball-type valve that may be adapted for convenient operation in any particular installation. The invention also provides effective structure for locking the valve plug in any position and which is automatically unlocked by merely turning the valve handle to readjust the position of the plug.

Many modifications and variations of the invention will be apparent to those skilled in the art in view of the foregoing detailed disclosure. Therefore, it is to be understood that, within the scope of the appended claims, the invention may be practiced otherwise than as specifically shown and described.

What is claimed is:

1. In a valve construction including a valve body, a plug rotatable in the valve body for establishing fluid flow in a first position and blocking fluid flow in a second position, and a shaft for rotating the plug, the improvement comprising locking means connected to said shaft for normally preventing rotation thereof, said locking means including wedging means operative in opposite directions of rotation of said shaft, drive means operatively connected to said locking means, said drive means including means for sequentially disengaging said wedging means and then rotating said shaft, and handle means rotatably connected to said valve body for operating said drive means.

2. In a valve construction including a valve body, a plug rotatable in the valve body for establishing fluid flow in a first position and blocking fluid flow in a second position, and a shaft for rotating the plug, the improvement comprising locking means connected to said shaft for normally preventing rotation thereof, said locking means including wedging means operative in opposite directions of rotation of said shaft, drive means operatively connected to said locking means, said drive means including means for sequentially disengaging said wedging means and then rotating said shaft to move said plug between said first and second positions, and handle means rotatably connected to said valve body for operating said drive means, said handle means including means selectively engageable and disengageable with said drive means for permitting said handle means to be rotated to a selected one of a plurality of different angular positions relative to said valve body when disengaged and to actuate said drive means when engaged in said one position.

3. The improvement claimed in claim 2 including cooperating means on said shaft and said valve body for limiting rotation of said shaft between the first and second positions of said plug.

4. The improvement claimed in claim 3 wherein said cooperating means includes means for reversing the direction of rotation of said handle means required to move said plug from its first position to its second position.

5. In a valve construction including a valve body, a plug rotatable in the valve body for establishing fluid flow in a first position of rotation and blocking fluid flow in a second position of rotation, and a shaft for rotating the plug, the improvement comprising a housing mounted on said valve body, said shaft extending into said housing, locking means connected to said shaft in said housing, said locking means including wedging means engageable with the inside wall of said housing to normally prevent rotation of said shaft in either direction, drive means rotatably carried in said housing, said drive means including means for sequentially disengaging said wedging means and thereafter rotating said shaft, and actuating means rotatably carried on said housing, said actuating means including means for selectively rotatably engaging said drive means to cause rotation of said shaft and disengaging said drive means to permit rotation of said handle means to a selected one of a plurality of different angular positions relative to said valve body.

6. The improvement claimed in claim 5 wherein said locking means comprises a locking ring fixed to said shaft, said locking ring having peripheral surface portions spaced from the inside wall of said housing, said peripheral surface portions being eccentric with relation to the axis of said housing and converging toward the inside wall of said housing in opposite directions of rotation of said shaft, and wherein said wedging means comprises a pair of rollers contiguous to the peripheral surface portions of said locking ring, and spring means normally urging said rollers into wedging engagement between the inside wall of said housing and the converging peripheral surface portions of said locking ring.

7. The improvement claimed in claim 6 wherein said drive means comprises a drive ring including roller-engaging legs, said legs being engageable with said rollers when said drive ring is rotated to force the rollers out of wedging engagement with the inside wall of said housing.

8. The improvement claimed in claim 7 wherein said handle means comprise a handle plate rotatable about the axis of said shaft, and a handle extending from said handle plate; and wherein said drive means for selectively engaging and disengaging said drive means comprises teeth rotatably engageable with said drive plate, said handle plate being movable in translation to disengage said teeth from said drive plate.

9. In a valve construction including a valve body, a plug rotatable in the valve body between a first position of rotation to permit full fluid flow through the valve body and a second position of rotation to block fluid flow, and a shaft for rotating the plug, the improvement comprising a housing mounted on the valve body, said shaft extending into said housing, a drive ring rotatably carried in said housing, means operatively connecting said drive ring to said shaft for causing it to rotate when said drive ring is rotated, said drive ring having an annular ring of teeth formed on one surface, a handle plate rotatably carried on said housing, said handle plate having a tooth cooperatively engageable with said annular ring of teeth on said drive ring, a handle extending from said handle plate, and means connecting said handle plate to said drive ring for permitting said handle plate to be moved toward and away from said drive ring, said handle plate being movable toward said drive ring to place the cooperating teeth into engagement for rotating said drive ring, and said handle plate being movable away from said drive ring to disengage said cooperating teeth for permitting said handle and handle plate to be angularly adjusted relative to said drive ring.

10. The improvement claimed in claim 9 including means operatively connected between said housing and said shaft for limiting rotation of said shaft between said first and second positions of said plug, and wherein said means for limiting rotation of said shaft comprises a pair of abutments operatively fixed to said shaft, said abutments being angularly disposed at right angles to each other to define the first and second positions of the plug, a pair of holes through the side wall of said casing, said holes being angularly spaced 90° from each other, and a stop pin mounted in one of said holes to extend between said abutments, said pin being mountable in the other of said holes for reversing the direction of movement of said handle required to move said plug from its first position to its second position.

11. A device comprising a body, a shaft journaled in said body for rotation, said shaft having an end portion extending through a wall of said body, a shaft housing mounted on said body, said end portion of said shaft being journaled in said housing, a locking ring fixed to said end portion of said shaft, said locking ring having peripheral, bearing surface portions that are eccentric with relation to the axis of said housing, said peripheral surface portions converging toward the inside wall of said housing in opposite directions of rotation of said shaft, a pair of rollers mounted contiguous to said peripheral surface portions of said locking ring, means normally urging said rollers into wedging engagement between the inside wall of said housing and the converging peripheral surface portions of said locking ring to prevent rotation of said shaft, a drive ring rotatably carried in said housing, said drive ring including first and second roller-engaging legs for respectively engaging one of said rollers when said drive ring is rotated to move the roller out of wedging engagement between said locking ring and the inside wall of said housing, a drive leg on said drive ring for engaging and rotating said locking ring after the roller normally preventing rotation has been moved out of wedging engagement, a handle plate rotatably carried on said housing, said handle plate and said drive ring having inter-engaging cooperating teeth for causing said drive ring to rotate when said handle plate is rotated, said handle plate being movable in translation to disengage said teeth and permit rotation of said handle plate relative to said drive ring, and a stop carried by said housing, said stop being engageable with cooperating abutments on said locking ring for limiting rotation of said shaft between first and second positions.

12. The device as claimed in claim 11 wherein said peripheral, bearing surface portions of said locking ring comprise the heads of spanner bolts threaded in said locking ring.

13. The device as claimed in claim 11 wherein said cooperating abutments on said locking ring comprise an annular collar surrounding said shaft, said collar being cut away in one quadrant to form a recess having spaced end walls, said stop carried by said housing being relatively movable in said recess for engaging said end walls and thereby limiting rotative movement of said shaft between said first and second positions.

14. The device as claimed in claim 13 wherein said stop comprises a pin, and wherein said housing is formed with a pair of stop pin-receiving holes that are angularly spaced 90° from each other, said stop pin being receivable in either of said holes for defining the first and second positions of said shaft.

15. A valve comprising, a valve body member having a fluid passage extending from an inlet to an outlet, a circular valve plug member journaled in the said body and including a through fluid passage, said valve plug member having a full closed position and a full open position with the plug member passage in alignment with the body member passage, seat means between the body member and the plug member in sealing engagement with the plug member at least when the plug member is in the closed position to seal one passage from the other and thereby prevent the passage of fluid through the valve, actuation means connected to the plug member to rotate the plug member selectively from the full closed position to the full open position and return, lock means connected to one of the members and operably connectable to the other of the members at least when the plug is in a position between the full open and closed position, said lock means operative connection occurring in response to fluid pressure exerted on the plug by flowing fluid thereby to lock the plug against rotation induced by such flowing fluid, and said actuation means including disengagement means to disengage said operative connection and thereby render the locking means ineffectual when the plug is rotated by the actuation means.

16. A valve comprising a valve body having a fluid passage extending from an inlet to an outlet, a rotatable valving member journalled in said body, said valving member providing a closed position and an open position of said valve, seat means between said body and said valving member in sealing engagement therewith at least when said valving member is in the closed position to seal said inlet from said outlet, locking means carried by said valve and being operably connected between a fixed portion thereof and said valving member at least when said member is positioned between the opened and closed positions, said locking means including means responsive to torque action of said valving member due to fluid flowing in said body thereby to lock said valving member against rotation induced by such flowing fluid, and actuating means carried by said device for rotating said valving member, said actuating means including handle means and means for engaging said torque responsive means and rendering it ineffective when said handle means is moved to rotate said valving member.

17. The device as claimed in claim 16 wherein said actuating means comprises a drive member operatively connected to said valve body, and wherein said handle means includes means selectively engageable and disengageable with said drive member in a plurality of different angular positions relative to said body.

18. In a device including a body and a shaft rotatably mounted by said body, the improvement comprising locking means normally connecting said shaft to said body against rotation, a drive ring rotatably carried by said body, means operatively connecting said drive ring to said locking means and to said shaft for disengaging said locking means and rotating said shaft when said drive ring is rotated, said drive ring having an annular ring of teeth formed on one surface, a handle plate rotatably mounted on said body, said handle plate having a tooth cooperatively engageable with said annular ring of teeth on said drive ring, a handle extending from said handle plate, and means mounting said handle plate for movement toward and away from said drive ring, said handle plate being movable toward said drive ring to place the cooperating teeth into engagement so that said drive ring can be rotated by turning said handle and said handle plate being movable away from said drive ring to disengage said cooperating teeth for permitting said handle and handle plate to be adjusted angularly relative to said drive ring.

19. The device as claimed in claim 18 including means operatively connecting said shaft and said body for limiting rotation of said shaft between two angularly spaced positions.

20. The device as claimed in claim 19 wherein said means for limiting rotation of said shaft comprises abutment means fixed on said shaft and cooperating abutment means on said body, one of said abutment means being formed by surfaces angularly disposed at right angles to each other so as to define the angularly spaced positions of said shaft, the other end of said abutment means being formed by a pair of holes spaced at right angles to each other and a stop pin mounted in one of said holes to extend between said surfaces, said pin being mountable in the other of said holes for reversing the direction of handle movement required to rotate said shaft between said angularly spaced positions.

References Cited by the Examiner

UNITED STATES PATENTS

| | | | |
|---|---|---|---|
| 1,385,785 | 7/21 | Hofer | 192—8 XR |
| 1,473,634 | 11/23 | Loudon | 251—77 |
| 1,983,284 | 12/34 | Geise | 192—8 XR |
| 2,493,966 | 1/50 | Hartley | 251—297 XR |
| 2,531,970 | 11/50 | Deal | 192—8 |
| 2,559,960 | 7/51 | Houplain | 74—531 XR |
| 2,660,902 | 12/53 | Wagner | 192—8 XR |
| 2,934,188 | 4/60 | Bremer | 192—8 |

FOREIGN PATENTS 565,023   11/32   Germany.

WILLIAM F. O'DEA, *Primary Examiner.*

UNITED STATES PATENT OFFICE
CERTIFICATE OF CORRECTION

Patent No. 3,198,477                                  August 3, 1965

George G. Allenbaugh, Jr.

It is hereby certified that error appears in the above numbered patent requiring correction and that the said Letters Patent should read as corrected below.

Column 5, line 29, for "form" read -- from --; column 7, line 8, for "handle" read -- actuating --; line 30, for "handle", first occurrence, read -- actuating --; column 10, line 17, strike out "end".

Signed and sealed this 19th day of April 1966.

(SEAL)
Attest:

ERNEST W. SWIDER                                       EDWARD J. BRENNER
Attesting Officer                                            Commissioner of Patents